Oct. 4, 1960
J. GALLARDO
2,955,272
TELEVISION AND ELECTRIC APPLIANCE LOCK
Filed March 10, 1959
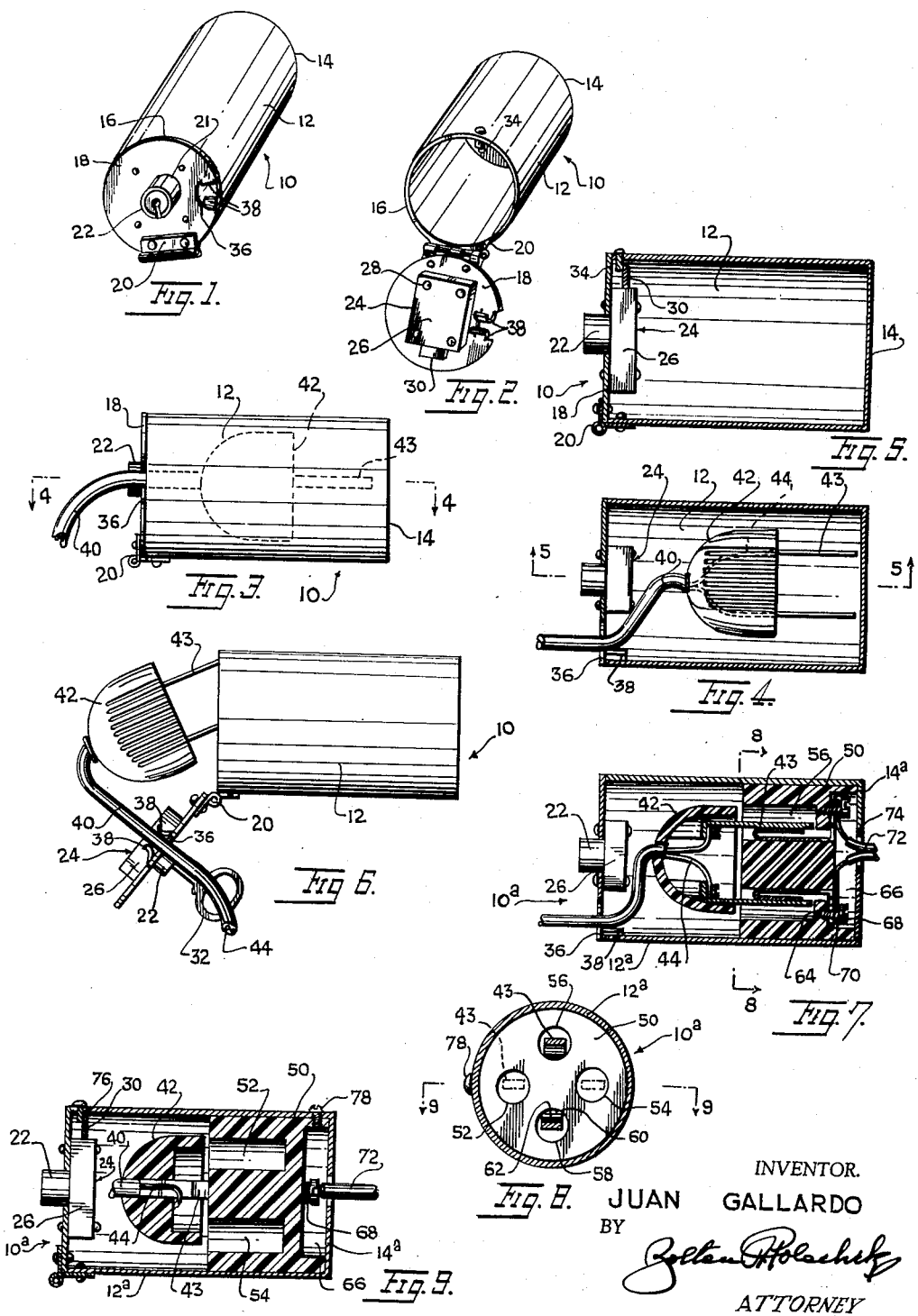
INVENTOR.
JUAN GALLARDO
BY
ATTORNEY United States Patent Office 2,955,272
Patented Oct. 4, 1960

2,955,272

TELEVISION AND ELECTRIC APPLIANCE LOCK

Juan Gallardo, 768 Fox St., Bronx, N.Y.

Filed Mar. 10, 1959, Ser. No. 798,484

1 Claim. (Cl. 339—37)

This invention concerns a locking device for an electric plug or receptacle.

It is often required to disable an electric cord of an electrical appliance so that it cannot be plugged into an electrical outlet. No convenient means for accomplishing this purpose has hitherto been available. To meet this need I have devised a lock box so arranged that the plug end of an electric cord of an appliance can be locked therein. The box is provided with a hinged locked cover. The cord passes through an opening or slot in the cover in such a manner that when the cover is opened the plug end of the cord is withdrawn from the box. In one form of the invention there is also provided an electrical receptacle, socket or outlet into which the electric plug can be inserted to effect an electrical connection to a source of electric power. The socket is provided with one plug receiving position which is electrically inactive so that the electric circuit is maintained open. In either open or closed circuit positions, the box can be locked so that the circuit condition cannot be changed without unlocking the box.

It is therefore a principal object of the invention to provide a lock box for an electric plug at the end of an electric cord.

It is a further object to provide a lock box having a hinged cover adapted to withdraw an electric plug therefrom when the cover is opened.

It is a further object to provide a lock box for an electric plug with a socket disposed in the box for receiving the plug in open or closed electric circuit arrangement.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a closed lock box embodying the invention.

Fig. 2 is a perspective view of the lock box in an open position.

Fig. 3 is a side elevational view of the lock box with the end of an electric cord locked therein.

Fig. 4 is a longitudinal sectional view on an enlarged scale taken on line 4—4 of Fig. 3.

Fig. 5 is a longitudinal sectional view taken on line 5—5 of Fig. 4, the electric cord being omitted.

Fig. 6 is a side elevational view of the lock box in an open position, showing the electric cord displaced.

Fig. 7 is a longitudinal sectional view similar to Fig. 4 of another lock box according to the invention.

Fig. 8 is a sectional view taken on line 8—8 of Fig. 7.

Fig. 9 is a longitudinal sectional view taken on line 9—9 of Fig. 8.

In Figs. 1–6, there is shown a box 10 including a hollow cylindrical case 12 having a closed end 14. At the open end 16 is mounted a circular cover 18 pivotally secured by a hinge 20 peripherally attached to the cover and free end of the casing. Near the center of the cover is an opening 21 through which extends the cylindrical keyway 22 of a lock 24 of conventional type. The internal structure of the lock is conventional and forms no part of the present invention so internal details of the lock are omitted from the drawing. The lock housing 26 is rectangular in form and is secured to the cover by rivets 28. The housing carries a slide or tongue 30 which is retractable into the housing or extendable therefrom when a removable key 32 is inserted in the cylindrical keyway 22 and turned in the usual manner.

A pin or lip 34 may be located near the open end 16 of the casing to engage the tongue 30 when it is radially extended as best shown in Fig. 5. About 90° from hinge 20 on cover 18 is a peripheral radially extending slot 36. This slot is formed by cutting the periphery of the cover radially and bending the two cut portions inwardly to form curved spring clips or flexible walls 38. These clips or walls will hold frictionally an electric cord 40 which can be engaged therebetween. The cord 40 will terminate in a conventional type of plug 42 having the usual two prongs 43 attached to wires 44 embedded in the cord 40.

When the box is closed and locked as shown in Figs. 3 and 4 the plug 42 is locked in the case 12. The cord 40 is held between the clips 38. When the box is unlocked as shown in Fig. 6, the act of opening the cover 18 will withdraw the cord 40 and the plug 42 from the case. The cord can then be removed from the cover and the plug can be inserted into a suitable electrical outlet for energizing the appliance (not shown) at which the cord 40 terminates.

In the form of the invention shown in Figs. 7–9, there is shown lock box 10ᵃ provided with a socket 50 in the case 12ᵃ. This socket has a cylindrical body with four spaced longitudinal bores. One pair of bores 52, 54 has blind ends. They are long enough and wide enough to receive the prongs 43 of the plug 42 as indicated by dotted lines in Fig. 8 so that the plug will be held open circuited. The other pair of bores 56, 58 have electrical terminal elements 60 disposed therein. These elements terminate at their inner ends in spring fingers 62 adapted to engage with the prongs 43 as shown in Fig. 7. The elements 60 terminate in lugs 64 seated in a recess 66 in the socket. Screws 68 threaded in the body of the socket retain the elements 60 in position in the socket and also serve to secure the free ends 70 of a double wire electric cord 72. This cord passes through an opening 74 in the closed end 14ᵃ of the case 12ᵃ. The cord 72 terminates a suitable source of electric power (not shown).

In the arrangement shown in Figs. 7–9, cord 40 is in closed electric circuit with cord 72. If the plug were rotated 90° with prongs 43 inserted in bores 52, 54, then the cord 40 and plug 42 would be open circuited. In either case the closed and locked cover would securely maintain the cord 40 in the selected closed or open electric circuit condition.

The plug 42 can be released for changing its position or for removing it from the case only by unlocking the cover. A pin 76 in the side of the case 12ᵃ is adapted to receive the tongue 30 when in extended position as shown in Fig. 9. A lateral screw or rivet pin 78 may be provided for securing the socket 50 in the case.

The invention provides a tamperproof means for maintaining the plug end of an electrical appliance cord in selected open or closed circuit condition subject solely to the holder of the key 32. The case and cover may be made of metal or plastic material. The device in either form described has utility in homes, hotels, motels, factories and other places where it is desired that the electrical connection of an electric cord be under the control of authorized persons only, to prevent children and unauthorized persons from activating or deactivating an electrical appliance.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A lock box for an electric cord and plug, comprising a hollow cylindrical casing having an integrally formed closed end and an open end, a circular cover hinged to the open end of the casing, said cover having a radially extending lateral slot with flexible walls adapted to grip said cord, said walls extending inwardly into the casing when the cover is closed, a lock secured to the cover for locking the cover in a closed position on the casing, said casing having catch means for engaging a tongue of the lock, said slot being disposed about ninety degrees from the hinge so that when the cover is being opened said cord and plug are withdrawn from the casing, an electric socket disposed in the casing at the closed end thereof, and an electric supply cord passing through the closed end of the casing and terminating at terminals in the socket, said socket having a pair of bores for receiving prongs of said plug in closed electric circuit with said terminals, said socket having another pair of bores for receiving said prongs in an open electric circuit, said catch means being a pin projecting inwardly from a side of the casing near the open end thereof, said lock holding the plug in the socket when the cover is closed.

References Cited in the file of this patent

UNITED STATES PATENTS

| | | |
|---|---|---|
| 650,432 | Stewart | May 29, 1900 |
| 1,278,339 | Hastings et al. | Sept. 10, 1918 |
| 1,735,656 | Rossi | Nov. 12, 1929 |
| 1,869,936 | Griswold | Aug. 2, 1932 |
| 1,937,942 | Briggs | Dec. 5, 1933 |
| 2,227,743 | Bone | Jan. 7, 1941 |
| 2,643,787 | Rockman | June 30, 1953 |

FOREIGN PATENTS

| | | |
|---|---|---|
| 367,545 | Germany | Jan. 23, 1923 |
| 585,750 | Germany | Oct. 7, 1933 |